Oct. 27, 1953 — W. F. MELLEN — 2,656,774
AUTOMATIC TRIP FOR TWO-WAY PLOW
Filed Aug. 16, 1948 — 3 Sheets-Sheet 3
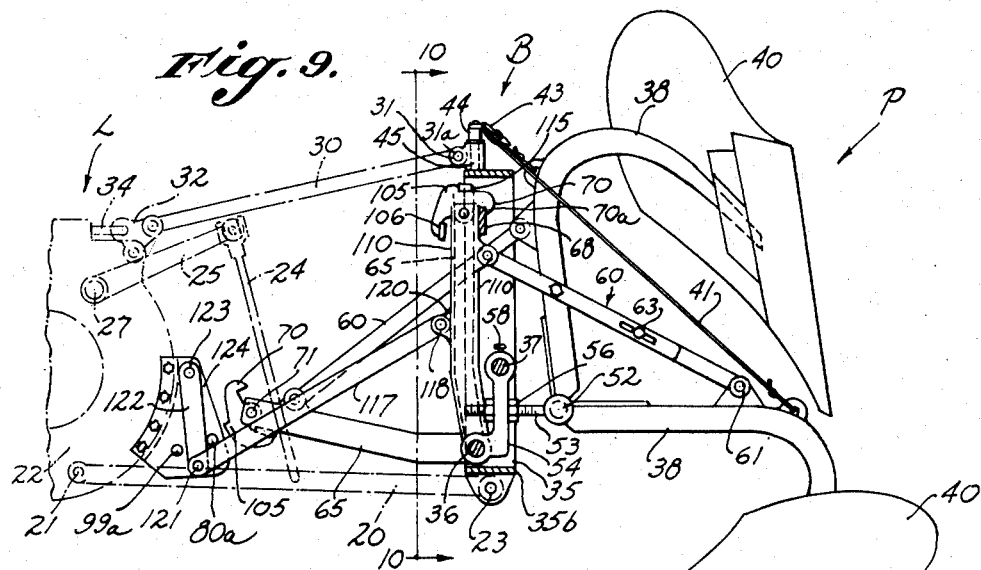
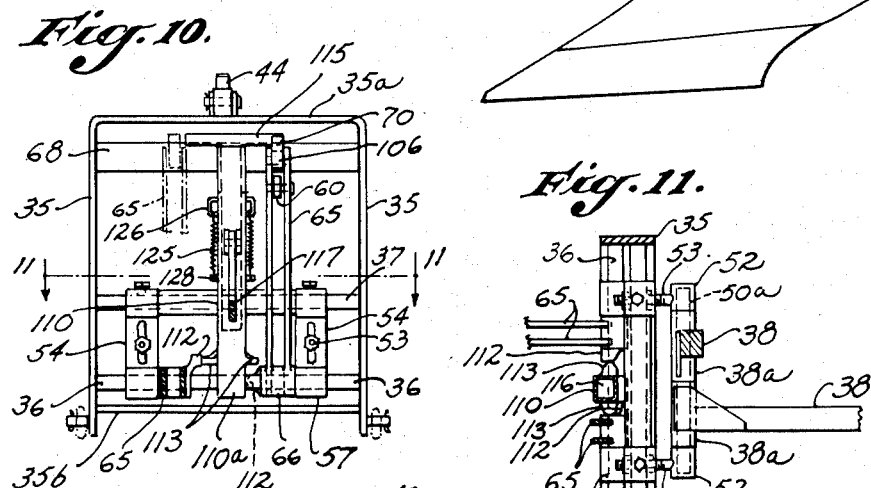
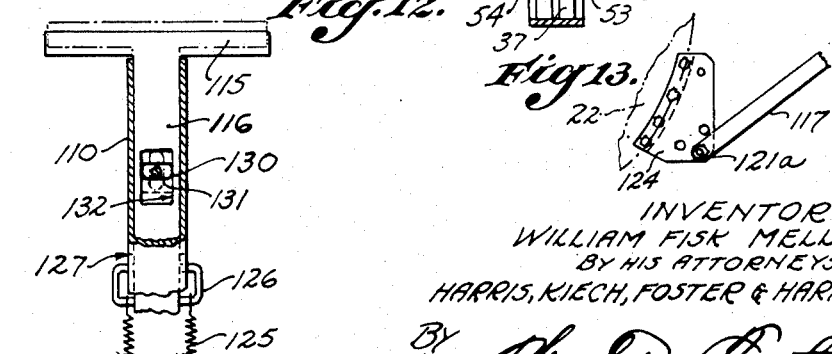
INVENTOR:
WILLIAM FISK MELLEN
BY HIS ATTORNEYS
HARRIS, KIECH, FOSTER & HARRIS

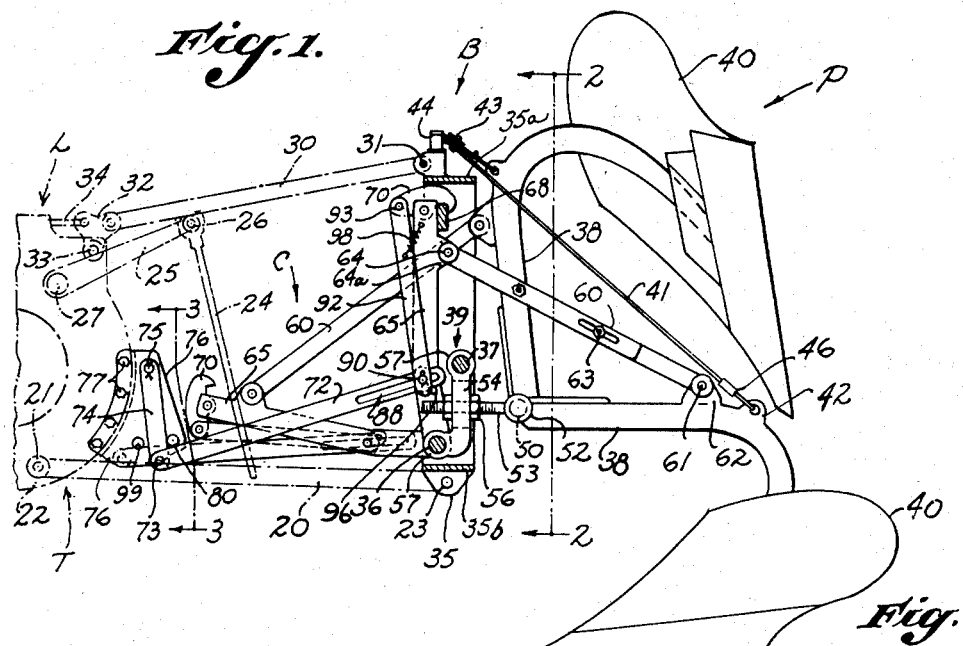

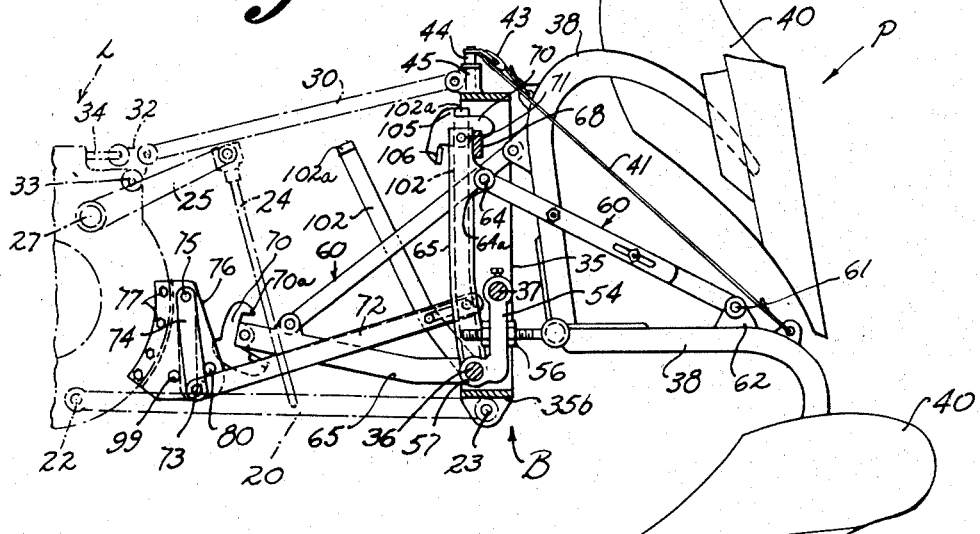
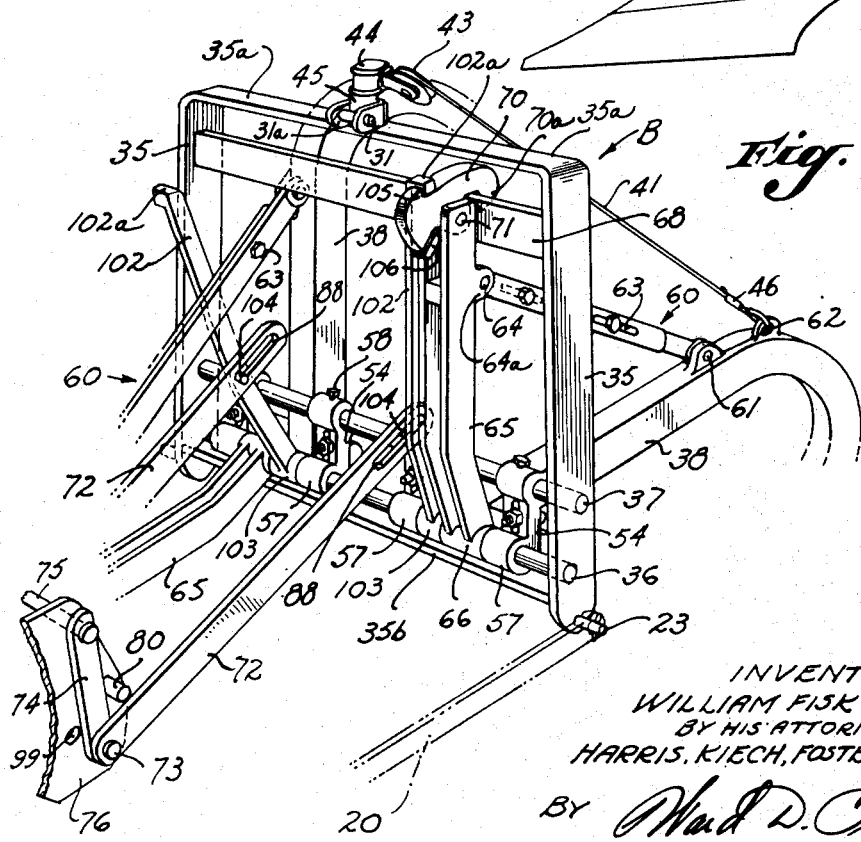

UNITED STATES PATENT OFFICE 2,656,774

AUTOMATIC TRIP FOR TWO-WAY PLOW

William Fisk Mellen, Whittier, Calif., assignor to Alice Marian Mellen, Whittier, Calif.

Application August 16, 1948, Serial No. 44,483

22 Claims. (Cl. 97—29)

This invention relates to earthworking implements of the type commonly known as two-way plows which are adapted to be drawn by tractors having automatic power lift apparatus contained therein for the purpose of lifting the plows from the ground being tilled.

Two-way plow structures provide oppositely pitched plows which are adapted to be selectively raised and lowered, and are herein referred to as plow bottoms, one plow bottom being lowered when plowing across a field in one direction, and the other plow bottom being lowered for the purpose of plowing across the field immediately alongside the previously formed furrow, whereby all furrows will be turned in the same direction without the necessity of following the old practice of travelling around the unplowed periphery of the field and progressing in ever narrowing loops toward the center to keep adjacent furrows turned in the same direction.

A particular object of the present improvement is to provide novel means under the control of the tractor driver for producing automatic shift of the plow bottoms through the medium of the power lift means on the tractor whereby to reverse the plow beams as may be required in connection with any earthworking operation.

Another object of the invention is to provide in a two-way plow structure means for interconnecting the two plow bottoms in counterbalanced relationship so that an actuating means may be shifted by the tractor driver to energize lifting means for one plow bottom while freeing lifting means for the other plow bottom and allowing such other plow bottom to descend without interference.

A further object of the invention is to provide transversely movable means which may be readily and selectively moved from one position to another for selectively energizing the mentioned energizing means as required and to neutralize said action when desired.

A still further object of the invention is to provide locking means for each of the plow bottoms so that the respective plow bottom may be held down in operative position, means being employed in conjunction with such locking means, upon energization of the mentioned lifting means, so that initial movement under the influence of such lifting means will release the locking means.

It is still an additional object of the invention to provide means for locking the descending plow bottom in operative position under influence of the final portion of the downward movement thereof.

An additional object of the invention is to provide a novel frame construction and arrangement for mounting plow bottoms so that they may be easily assembled upon said frame and may be easily adjusted from side to side with respect to one another and may also be easily adjusted to direct the toe of each plow bottom as may be best suited for the particular soil being cultivated.

It is also an object of the invention to provide a plow structure employing two-way plow bottoms wherein means may be laterally shifted upon the mentioned frame structure for selectively energizing the lifting of the respective plow bottom through the rising and falling movements of the plow bottoms themselves.

The subject matter herein disclosed but not claimed is being claimed in the continuation-in-part application Serial No. 175,082, filed July 21, 1950.

Other objects, and the various features of the invention will become apparent to those skilled in this art upon reference to the following specification and the accompanying drawings wherein certain embodiments of the invention are illustrated.

In the drawings:

Fig. 1 is a side elevation of a two-way plow structure having two plow bottoms, one of the plow bottoms being in lowered, operative position and the other one in elevated, inoperative position, the unit being mounted upon the rear of a tractor provided with a conventional power lift device;

Fig. 2 is principally a rear elevation taken from the line 2—2 of Fig. 1, some of the parts being indicated in section;

Fig. 3 is a vertical sectional detail as indicated by the line 3—3 of Fig. 1;

Fig. 4 is a fragmentary side elevational detail as indicated by the line 4—4 of Fig. 2;

Fig. 5 is a fragment of the structure shown in Fig. 4 and indicates a different operative position of the parts;

Fig. 6 is a transverse sectional and elevational view taken approximately from the line 6—6 of Fig. 4;

Fig. 7 is an elevational view similar to that of Fig. 1 showing a construction providing a modified form of latch operating means;

Fig. 8 is a perspective view of the structure shown in Fig. 7;

Fig. 9 is a side elevational view similar to that of Figs. 1 and 7 and showing a still further form of latch operating means;

Fig. 10 is principally an elevational view as indicated by the line 10—10 of Fig. 9;

Fig. 11 is a cross section taken from the line 11—11 of Fig. 10;

Fig. 12 is an enlarged sectional detail, parts being shown in elevation, of the latch operating means of Fig. 10; and Fig. 13 shows a modified form of mounting for the pull link of Fig. 9.

Each of the forms of construction illustrated in the drawings comprises principally a box frame, generally indicated at B, which in some respects substitutes for a so-called A-frame frequently employed with this type of equipment, a plow assembly generally designated as P and comprising two counterbalanced, oppositely pitched plow bottoms, a power lift mechanism generally indicated at L and carried by the rearward end of a tractor generally represented at T, and an actuating and control linkage generally indicated C.

The box frame B is supported at its lower end by a pair of spaced lifting arms 20 whose forward ends are pivotally attached by appropriate pivots 21 to the lower side portions of a rear housing 22 constituting a portion of the body of the tractor T. The opposite or rearward ends of the lifting arms 20 receive the ends of stub shafts 23 which laterally project from the lower side portions of the box frame B, this assembly being maintained by cotter keys, or otherwise as desired. The lifting arms 20 are controlled by pull rods 24 which are actuated by crank arms 25 through the medium of universal joints 26, said arms 25 being conventionally affixed to and actuated by a bell crank shaft 27 which projects through the tractor housing 22 and is in turn operated by hydraulic mechanism (not shown) contained within the housing 22. The crank arms 25, the shaft 27 to whose opposite ends the arms 25 are attached, and the hydraulic apparatus within the housing 22 comprise the power lift L which is a well known construction forming no part of this invention and, therefore, will not be further disclosed. The upper end of the box frame B is maintained in a required vertical position through the medium of a positioning bar 30 connected to an upper portion of the frame B as by a pivot bolt 31, passed through ears 31a, on the frame B, the opposite end of the bar 30 being connected to the housing 22 of the tractor T by means of a triangular plate 32 whose lower corner is mounted by a pivot 33 upon the housing 22. The rearward upper corner of the plate 32 is pivotally connected with the forward end of the positioning bar 30 and the other upper corner of the plate 32 is pivotally connected with a power lift control rod 34 which extends forward into an upper continuation of the housing 22 (not shown) where it serves to regulate flow of hydraulic power fluid to the power lift L in a well known manner.

The form of box frame B illustrated comprises two opposed, vertically positioned side members 35 whose lower extremities carry the stub shafts 23 by which the frame B is supported upon the lifting arms 20. The upper ends of the side members 35 are connected by a top cross bar 35a, and the lower ends of the side members 35 may be connected by a bottom cross bar 35b. The cross bars 35a and 35b are rigidly affixed to the members 35, thereby producing a rigid unitary construction of the box frame B. Extending transversely above the cross bar 35b and near the lower ends of the side members 35 is a horizontal mounting shaft 36 and above the shaft 36 a short distance is a second horizontal mounting shaft 37. The ends of the shafts 36 and 37 are affixed in the side members 35 of the frame B, the shaft 36 being set closer to the forward edges of the side members 35 than is the shaft 37 which is set somewhat nearer the rearward edges of the side members 35. The mounting shafts 36 and 37 serve to mount the forward ends of two spaced plow beams 38, this being accomplished through the medium of a plurality of mounting devices generally indicated at 39 and presently to be described. The rearward ends of the plow beams 38 carry conventional plow bottoms 40 secured thereto in any conventional manner and respectively pitched in opposite directions. Thus, two oppositely disposed plow unith are provided so that, when the plow structure P is being drawn in a given direction, one plow bottom 40 will turn a furrow to one side and the other plow bottom 40 will turn a furrow to the other side, according to which plow unit is raised and which plow unit is lowered. The bottoms 40 are also adapted for lowering at the same time so that they may function simultaneously and produce a ditch as they are drawn forward.

For the purpose of lowering one plow bottom while the other is being raised, the two plow bottoms 40 are interconnected by a flexible cable 41 whose ends are appropriately engaged, preferably adjustably, in eyes 42 provided on rearward portions of the respective plow beams 38, the middle portion of the cable 41 passing through a pulley 43 carried upon a post 44 or similar mounting which is removably retained in a socket 45 or the like fixed on the middle of the top cross bar 35a on the box frame B, and rigidly secured thereto and to the ears 31a which position the rearward end of the positioning bar 30. By detaching the post 44 from the socket 45 or equivalent mounting, both plow bottoms 40 may be lowered for ditching purposes. To provide for adjustment of the length of the cable 41 as may be required, at least one end of the cable is provided with a removable or adjustable clamp device 46.

For the purpose of mounting the plow bottoms 40 so that they may be raised and lowered, the forward ends of the plow beams 38 are provided with laterally projecting pivot pins 50 received in eyes 52 mounted on the ends of eye bolts 53. In the form illustrated, the outer ends of the eyes 52 are closed to form sockets in which the ends of the pivot pins 50 are received. There being an eye bolt 53 at each side of each plow beam 39, several bolts 53 are required to be mounted for proper support of the plow beams 38 and the plow bottoms 40. For this purpose, four of the previously mentioned mounting devices 39 are employed and these are located in pairs for respectively receiving the eye bolts 53. Each device 39 is in the form of a vertically disposed elongated block 54 having a vertical, slightly arcuate slot 55 which receives the respective eye bolt 53. The ends of the eye bolts 53 are threaded and are adjustably bound into position in the slots 55 of the blocks 54 by means of nuts 56 disposed on opposite sides of the blocks 54. By shifting the eye bolts 53 slightly in the slots 55 the plow beams 38 may be shifted about their axes and the pitch of the plow bottoms 40 varied as required. Similarly, the relative effective lengths of the eye bolts 53 between the blocks 54 and their eyes 52 may be adjusted to vary the angular direction of the plow beams 38 as necessary. As best seen in Fig. 1, the blocks 54 of the mounting devices 39 are somewhat L-shaped, and their upper and lower ends are snugly, but slidably, fitted upon the upper and lower mounting shafts 37 and 36 through the medium of transversely arranged eyes 57. These parts are assembled before the shafts 36 and 37 are mounted on the box frame B. The spacing of the two plow bottoms 40 from each other is readily accomplished by sliding the mounting blocks 54 along the shafts 36 and 37 as required, and the pivot pins 50 of the plow beams 38 are readily positioned by shifting one of the blocks 54 of each pair with respect to the other. Properly adjusted positioning of the mounting blocks 54 is maintained by means of set screws 58 which bind the respective eyes 57 upon the upper mounting shaft 37, as best illustrated in Fig. 2.

In order to lift the respective plow bottoms 40, each plow bottom is provided with a pull bar 60 whose lower and rearward end is connected by a pivot pin 61 to an ear 62 attached to a rearward portion of the respective plow beam 38. Each pull bar 60 may be a single bar of fixed length as indicated in Fig. 2 and at the left of Fig. 1, or it may be in two sections adjustably connected as by bolts and slots as indicated at 63 in Figs. 1, 7, 8 and 9. The upper forward end of each pull bar 60 is attached by a pivot pin 64 between ears 64a formed on rearward upper edge portions of a bifurcated swinging control or actuating arm 65 whose lower end is pivoted on the lower mounting shaft 36 by means of a transversely positioned hub 66. Thus, these swinging arms 65 serve to position the respective pivot pins 64 and also the upper and forward ends of the respective pull bars 60.

When each plow bottom 40 is in its lowered, operative position as seen in Fig. 1, the upper end of its swinging arm 65 engages at its rearward edge portion against the forward face of a transverse retention bar or lock bar 68 against which it is held by a latch 70 mounted upon a pivot 71 between the upper ends of the bifurcations of the respective swinging arm 65. The rearward end of each latch 70 has an overhanging latch finger 70a, as best seen in Fig. 4, this finger maintaining the locking relationship of the latch 70 with the bar 68. Since the ends of the lock bar 68 are rigidly secured, as by welding, to the side members 35 of the box frame B, the latch 70 insures proper penetration of the respective plow bottom 40 into the soil. Moreover, since each pull bar 60 is rigid, it also serves as a brace bar which prevents upward swinging movement of the respective plow bottom 40 during plowing and so long as the latch 70 is in locking position.

As best indicated in Figs. 2 and 8, each swinging actuating arm 65 is disposed substantially in the same vertical plane as the respective plow beam 38 by reason of the fact that the respective hub 66 is positioned between and fills the space between the lower eyes 57 of the respective pair of mounting blocks 54 carried on the upper and lower mounting shafts 36 and 37.

Each swinging arm 65 is connected with a pull link 72 whose forward end is pivotally secured by a pivot pin 73 to a corresponding energizing and positioning arm 74, these parts comprising together with the swinging arm 65 and its pull bar 60 the principal members of the actuating and control linkage C above mentioned. The upper ends of the positioning arms 74 for the two pull links 72 are pivoted upon a transverse shaft 75 carried in the upper ends of brackets 76 bolted or otherwise secured at their forward edges to the adjacent rear housing of the tractor T, such attachment being generally indicated at 77. In the form shown, spacers 78 (Fig. 3) are mounted upon the outer ends of the shaft 75 and these may be relied upon for lateral adjustment of the positioning arm 74 and the pull link 72 in accordance with lateral adjustment of the mounting blocks 54 on the mounting shafts 36 and 37 to vary the spacing of the plow beams and their plow bottoms 40.

Raising of the lowered plow bottom 40 from its operating position as illustrated in Fig. 1, while permitting lowering of the elevated plow bottom 40 through the counterbalancing action of the cable 41, is effected by the raising of the box frame B through the agency of the pull rods 24 and the lifting arms 20 when the bell crank shaft 21 and the crank arms 25 are hydraulically actuated under the control of the tractor driver by conventional means in the rear housing 22 connected with the power lift mechanism L. Thus, as the box frame B is raised by elevation of the rearward ends of the lifting arms 20, the connection of the swinging arm 65 for the lowered plow bottom 40 with the respective pull link 72 tends to pull the upper and rearward end of the pull link 72 upward and thereby swing the effective positioning arm 74 about its pivotal mounting on the transverse shaft 75 without producing any lifting effect upon the respective plow bottom 40. On the other hand, when the elevated plow bottom 40 is descending while the box frame B is being raised, it is necessary that its pull link 72 and energizing and positioning arm 74 be permitted to move. In order to care for these selective movements a draw bolt 80, best illustrated in Fig. 3, is transversely mounted in the lower portions of the brackets 76 so that its ends may be selectively slid laterally into the path of the lower end of the respective positioning arm 74 and out of the path of the other arm 74. Sliding movement of the draw bolt 80 is limited by a sleeve 81 fixed on the middle portion thereof and positioned so that the end of the draw bolt 80 being drawn from the path of one of the arms 74 is not entirely withdrawn from its seat in the respective bracket 76, as illustrated. Means are provided for the purpose of shifting the draw bolt 80, and in the form shown this includes an eye 82 fixed on the middle of the sleeve 81, the eye 82 having secured thereto the ends of two cables 83 which are then passed through guiding eyes 84 preferably affixed to the rigid brackets 76. The cables 83 (or other means used) extend to a position convenient to the operator of the tractor so that he may pull the respective cable 83 and thereby shift the draw bolt 80 into the path of the positioning arm 74 whose movement is to be prevented.

According to the form of construction of Figs. 1 to 6, each pull link 72 is directly connected to the respective swinging arm 65. According to the form of Figs. 7 and 8, there is a pull link 72 for each of the swinging arms 65, but indirect connection is provided, this occuring through the latch 70. In the form of Figs. 9 to 12, a single pull link 72 is employed and this operates through the medium of a single rock arm cooperating with the two swinging arms 65 in a manner presently to be described. In each of these forms, the latches 70 are actuated by different means as also will be described.

Having reference first to the form of Figs. 1 to 6 inclusive, the rearward and upper end of the link 72 in each instance is provided with an elongated lost-motion slot 88 which receives a transverse guiding and actuating pin 90 upon which is mounted pivotally the lower end of a latch operating control arm or trip arm 92, the upper end of the arm 92 being attached by a pivot pin 93 to the heel portion of the latch 70 at a position forward of the upper end of the respective swinging arm 65. Inasmuch as the latch operating trip arm 92 must be moved up and down for the purpose of actuating the latch 70, the necessary guided movement is provided by angularly positioned arcuate slots 94 formed in the bifurcations of the respective swinging actuating arm 65, as best illustrated in Figs. 4 and 5. In order that the movement of each actuating pin in its slot 94 may be properly guided and smooth, a short block 95 is in each instance provided between the bifurcations of the respective swinging arm 65, and each block 95 is mounted upon a pivot 96 located at the center about which the arcs 94 are described. Thus, as the actuating pins 90 move in the slots 94, the blocks 95 insure against any tendency to bind. Axial shift of the pins 90 is prevented by any appropriate means, such as the indicated heads at one end of the pins and the cotter keys at the other end.

From the foregoing, it will be apparent that, when the box frame B is being elevated and the respective pin 90 is brought to the rear end of the respective slot 88 in the corresponding pull link 72, there is a resultant draft upon the respective pin 90 causing it to move downward in its slot 94. Such downward movement pulls the respective latch operating trip arm 92 downward and rocks the respective latch 70 about its pivot pin 71, thereby withdrawing the respective latch finger 70a from behind the lock bar 68 so as to release the swinging arm 65 from the lock bar 68. As a consequence, further elevation of the box frame B under the influence of the pull rods 24 and the lifting arms 20 causes draft to be transferred through the respective pin 90 to the corresponding swinging arm 65, whereby the lowered plow bottom 40 is elevated by means of the respective pull bar 60. Such elevation of the lowered plow bottom 40, of course, requires that the draw bolt 80 be previously moved into position to block swinging movement of the respective positioning arm 74 as hereinbefore described. In order properly to align the latch operating trip arm 92, its pivot pin 93 is mounted in a laterally offset boss 97 integral with the heel of the respective latch 70. Each arm 92 may be loaded by a spring 98 for automatic return thereof and of its latch 70.

From the foregoing it will be apparent that as the box frame B of the form of Figs. 1 to 6 is elevated through the medium of the lifting arms 20 and the pull rods 24 from the power lift L, the draw bolt 80 being in operative position as indicated, the transverse guiding and actuating pin 90 will first be brought into the end of the slot 88 of the respective pull link 72 for that plow bottom 40 which is in lowered position, whereupon further draft by the pull link 72 will pull the actuating pin 90 downward in the arcuate slots 94, in conjunction with the swinging of the short block 95, whereupon the latch operating trip arm 92 will swing the respective latch 70 and lift its latch finger 70a from engagement behind the lock bar 68. Thus, upon further elevation of the box frame B, the respective swinging arm 65 will be moved from its upright position toward the lowered position seen at the left of Fig. 1, and the plow beam 38 for the respective plow bottom 40 will be elevated through the medium of the respective pull bar 60. At the same time, the other plow bottom 40 will have descended by gravity in synchronism with the elevation of the one plow bottom 40 by reason of the counterbalancing cable 41. In practice, the last portion of the descent of the plow bottom which is being lowered takes place solely under influence of gravity, and without the necessity for further elevation of the box frame B and consequent pull by the respective pull link 72, such final portion of the descent occurring by reason of the overbalancing of the descending plow bottom near the end of its movement, the center of gravity of the ascending plow bottom then moving in close to the vertical plane of the point of support provided by the pivot pin 50 and eyes 52.

The location of the bolt 80 as seen in Fig. 1, and also in Fig. 7, is such as to provide for a limited amount of swinging movement of the respective positioning arms 74 from their most forward position and during initial elevation of the box frame B as the lower plow is being withdrawn from the soil. However, should it be desired to eliminate such lost motion for any purpose, a hole 99 is provided in the respective bracket 76 just behind the forwardmost position of the respective positioning arm 74, and such hole 99 may receive any type of locking pin corresponding in general nature to the bolt 80.

In the form of the invention shown by Figs. 7 and 8, the latches 70 are operated by latch operating and control trip arms 102 instead of the latch operating arms 92 of the other form. Each trip arm 102 is provided at its lower end with a hub 103 which is swingingly mounted upon the lower transverse mounting shaft 36 between the hub 66 of the adjacent swinging arm 65 and the lower eye 57 of the adjacent mounting block 54. Affixed to one side of each latch operating arm 102 is an actuating pin 104 (Fig. 8) which is located about the same distance above the lower transverse mounting shaft 36 as are the actuating pins 90 and slots 94 of the other form. Each actuating pin 104 is positioned in the slot 88 of the corresponding pull link 72. Thus, when the box frame B is elevated and the pin 104 in each instance is brought into the outer end of the pull link 72, the pull link 72 tends to swing the latch operating or trip arm 102 from an upright position alongside the adjacent upstanding swinging arm 65 toward an inclined position such as indicated at the left of Fig. 8. When a plow bottom 40 is in lowered, operative position and its swinging arm 65 is upright, a catch in the form of a laterally extending lug 102a on the upper end of the respective latch operating arm 102 engages behind an upstanding shoulder 105 on an upper, somewhat forward portion of the respective latch 70. Thus, with the draw bolt 80 behind the respective positioning arm 74 whereby to energize and cause the respective pull link 72 to become effective, resultant draft upon the actuating pin 104 causes the respective lug 102a to pull against the upstanding shoulder 105 and lift the latch finger 70a of the latch 70 from behind the lock bar 68 so that the swinging arm 65 can swing forward upon its hub 66. Such swinging of the latch 70 upon its pivot pin 71 is limited by a stop 106 provided on the forward, lower heel portion of the latch 70 and extending laterally therefrom to engage with the forward edge portions of the bifurcations of the respective swinging arm 65. As soon as the respective stop 106 contacts such edge portions, the draft of the respective pull link 72 becomes effective to swing the corresponding swinging arm 65 from its upright position toward the position already assumed by the other swinging arm 65 for the other plow beam 38. Thus, the shoulder 105, when operated by the lug 102a on the respective latch operating arm 102, serves, through the medium of the actuating pin 104 and the respective pull link 72, to swing the corresponding arm 65 and lift the corresponding plow beam 38 and plow bottom 40 until raising of the respective plow bottom 40 has been completed and the other plow bottom has been lowered to its operative position. During the last portion of such movement, wherein descent of such other plow bottom to operative position is being completed by gravity, the lug 102a of the descending latch operating arm 102 may be disengaged from the descending latch 70 and corresponding shoulder 105, this being permitted by appropriate curvature of the top of the latch 70 as illustrated. In any event, when the box frame B is being lowered to bring the lowered plow bottom 40 into operative position in the soil, the wall at the inner end of the slot 88 in the respective pull link 72 may exert a holding or pushing effect upon the actuating pin 104 and forces the corresponding latch operating arm 102 and its lug 102a upward approximately to the angular position of such arm 102 illustrated in both of Figs. 7 and 8. The arm 102 is subsequently restored to a vertical position upon raising of the respective latch 70 and its actuating arm 65 when the corresponding plow bottom 40 is lowered. Fig. 7 is representative of a partially lowered relationship, and the above-mentioned holding or pushing effect, which takes place during continued lowering, results from engagement of the positioning arm 74 with the tractor housing 22, or the securing bolt 77, or, when the throw of the link 72 is small, by engagement of the positioning arm 74 with the previously mentioned pin placed in the hole 99 of the bracket 76. Thus, the links 72 may be termed push-pull members. Subsequently, when the respective plow beam 38 and its plow bottom 40 are lowered, the rising of the respective swinging arm 65 will cause the shoulder 105 of the respective latch 70 to engage the corresponding lug 102a and return the parts to the upright position illustrated, whereupon the respective overhanging finger 70a will drop into locking position behind the lock bar 68. This operation may be assured by spring loading each latch 70, but ordinarily momentum of the respective moving latch-operating arm 102 will be sufficient to press down the latch finger 70a as the top of the corresponding swinging arm 65 bumps into the lock bar 68 at the end of the descending movement of the respective plow bottom. This final movement is sharp and the inertia of the arm 102 is adequate for the purpose.

These operations may all be repeated to reverse the plow bottoms by shifting the draw bolt 80 to the opposite side.

When a plow bottom 40 is down in operative position and its latch 70 is locked behind the lock bar 68, such plow bottom is held down in proper operative position by reason of the fact that the respective pull bar 60 now operates as a brace bar maintaining the desired relationship. Similarly, if the positioning post 44 for the pulley 43 which positions the bight portion of the cable 41 is removed from its socket 45 and both plow bottoms 40 are lowered, both plow bottoms will then be locked down in operative position so that a ditch may be formed, the two plow bottoms throwing earth in opposite directions simultaneously. This same result may be accomplished with the structure of Figs. 1 to 6, and it may also be produced by the structure of Figs. 9 to 12.

The structure illustrated in Figs. 9 to 12 employs the same plow beams 38, plow bottoms 40, box frame B, transverse mounting shafts 36 and 37, eye bolts 53, mounting blocks 54, pulley 43, and swinging arm 65 as in the other form. However, in this instance only two mounting blocks 54 are employed and two eye bolts 53, and in conjunction with these a single transverse mounting pin or pivot pin 50a (Fig. 11) is used to support the plow beams 38, the hub portions 38a being sufficiently wide to fill the intervening space between the eyes 52 of the eye bolts. With this form of the invention, instead of employing two latch operating and control arms, such as the arms 102 of the form of Figs. 7 and 8, a single hollow latch-operating control arm or trip arm 110 is employed, this arm having a hub 110a (Fig. 10) rockingly mounted upon the lower transverse supporting shaft 36. The arm 110 is adapted to be shifted along the shaft 36 by cams 112, formed on the inner ends of the hubs 66 of the swinging arms 65 between the position shown in Fig. 10 and a corresponding position somewhat to the left thereof and at the opposite side of the vertical median line of the box frame B. Such shifting is accomplished by engagement of the cams 112 with diametrically opposed, cam operated projecting bosses 113 formed on the opposite sides of the latch operating arm 110, as best seen in Figs. 10 and 11. Thus, as the beams 38 are raised upward, the cams 112 respectively shift the latch operating arm 110 from one side of its median position to the other. This latch operating arm 110 operates in much the same way that the two arms 102 of the form of Figs. 7 and 8 operate, in that the ends of a tripping cross head 115 are made to serve as catches or trips and are selectively engageable with the upstanding shoulder 105 of the two latches 70 on the upper ends of the two swinging arms 65. Such selective engagement is brought about by the shifting of the arm 110 by the cams 112 so that one end of the cross head 115 is moved into the path of one of the shoulders 105 and the opposite end is withdrawn from the path of the other shoulder 105. The cross head 115 is rigidly carried upon the upper end of a vertical stem 116 which is telescopically mounted in the arm 110. As best illustrated in Fig. 11, the stem 116 is square, the arm 110 is likewise square and is also hollow to receive the stem 116. The object in making the stem 116 telescope is to permit the cross head 115 to be elevated above the shoulders 105 when necessary, and as hereinafter explained.

With the construction of Figs. 9 to 12, a single push-pull link 117 is employed in the place of the two links 72 of the other forms, and the rearward and upper end of this link 117 is pivotally attached as by a pivot pin 118 to ears 120 on the forward face of the arm 110. The forward and lower end of the pull link 117 is pivotally attached as by a pivot pin 121 to the lower end of a swinging energizing and positioning arm 122, corresponding with the positioning arm 74 and pivoted at 123 on the upper end of bracket means 124 corresponding with the bracket means 76 of the other forms but sufficiently offset to one side of the tractor housing 22 that the link 117 and its positioning arm 122 may be suitably centered. In this case a shiftable bolt 80a is provided in the bracket means 124 to correspond with the draw bolt 80 used in the forms of Figs. 1 to 8. When it is desired to elevate the box frame B without shifting the plow bottoms 40, the bolt 80a is withdrawn, but when it is desired to shift the plow bottoms 40, the bolt 80a is moved into position behind the control arm 122 so that the pull link 117 will be effective to pull down the upper end of the latch operating arm 110 as the box frame B is elevated by the power lift L through the medium of the pull rods 24 and the lifting arms 20. Thus, with this form if the bolt 80a is left in engaging position, the changing of the plow bottoms becomes automatic upon each excursion of the box frame B. The same result is accomplished with the modification of Fig. 13 where the pivot 121a for the push-pull link 117 is fixed in the bracket 124.

Should it be desired at any time to hold the positioning and energizing arm 122 against the tractor housing 22, for example to hold one of the plow bottoms 40 in slightly elevated position, the arm 122 may be shifted into the indicated position and locked therein, as by means of a cross pin mounted in holes 99a corresponding with the holes 99 previously described. Again, such a cross pin may be mounted in the holes 99a to limit such forward movement of the lower end of the control arm 122 for the purpose of forcing the upper end of the latch tripping or control arm 110 into its upright position so as to dispose the cross head 115 ahead of the shoulders 105 of the latches 70, such motion taking place as the box frame B is lowered to bring the lower plow bottom 40 into operative position with respect to the soil. Since, with some arrangements, the latch operating arm 110 and its cross head 115 will have been shifted after it has been passed by the returning swinging control or actuating arm 65 and the corresponding latch 70 on the way up to the vertical position of the latter, it is necessary that the cross head 115 be permitted to rise and ride over the curve of the respective shoulder 105 of the corresponding latch 70. This is permitted by the telescoping of the stem 116 in the square, hollow latch operating arm 110. Such elevation of the cross head 115, is indicated by the broken line position in Fig. 12. In order to insure return of the cross head 115 to its full line operative position, springs 125 may be relied upon, these springs having their upper ends attached to ears 126 projecting from the stem 116 through slots 127 (Fig. 12) in the hollow arm 110, the lower ends of the springs 125 being attached to lugs 128 projecting from the sides of the arm 110. The springs 125 also serve as spring loading means which cause the vertically disposed or operating latch 70 and its latch finger 70a to engage behind the lock bar 68 as indicated in Fig. 9. Otherwise, the latches 70 may be spring loaded in any conventional manner to force them into locking position.

Should it be desired to lock the cross head 115 in its elevated position, rotary cam means 130, Fig. 12, may be fixed upon a horizontally disposed stem 131 journalled in the walls of the hollow trip arm 110 and operable from the outside thereof. This cam means 130 is received in a rectangular opening 132 through the stem 116. Thus, rotation of the cam means 130 causes one end thereof to bear against the upper wall of the opening 132 and thereby raise and hold the stem 116 and its cross head 115 in the broken line position. Inasmuch as each swinging arm 65 is drawn forward by the cross head 115 through the agency of the respective latch 70 and its shoulder 105, the heel of each latch is provided with the same stop 106 as employed in the form of Figs. 7 and 8.

*Operation*

The operation of the various forms of the invention herein disclosed has been generally outlined in connection with the foregoing descriptions of the constructions. To recapitulate, when it is desired to raise the lowered plow bottom 40 of the form of Figs. 1 to 8 from its illustrated operative position, whereby to lower the oppositely pitched plow bottom 40, the draw bolt 80 is shifted laterally by the corresponding cable 83 to bring the corresponding end of the draw bolt 80 into position behind the respective positioning arm 74. The tractor driver then operates the manual control for the power lift mechanism L so that the pull rods 24 and the lifting arms 20 function to elevate the box frame B. In view of the location of the pivot pins 73 at the forward and lower ends of the pull links 72, the tendency is for the pivot pins 73 to swing rearward about their mountings on the transverse pivot shaft 75. However, one end of the draw bolt 80 will have been moved behind that positioning arm 74 connected with the pull link 72 for the lowered plow bottom 40. As a consequence, the pull link 72 is held so that the actuating pin 90 is soon brought into the outer end of the slot 88 in the pull link 72 for the respective plow bottom. Thus, the holding of the arm 74 by the draw bolt 80 causes such arm 74 to energize the respective pull link 72 which in turn energizes the respective swinging actuating arm 65 through the medium of the actuating pin 90. Initial draft of the pull link 72 upon the actuating pin 90 causes the latter to move downward in the slots 94 in the respective swinging arm 65 and thereby pull downward the latch operating arm or trip arm 92 attached thereto and as a consequence rock the respective latch 70 about its pivot pin 71 and withdraw the overhanging latch finger 70a from behind the lock bar 68, thereby releasing the top of the swinging arm 65 from the box frame B.

Continued elevation of the box frame B causes continued draft upon the actuating pin 90 and the respective swinging arm 65 so that the upper end of the latter is gradually pulled downward from its upright position into the lower position illustrated in Fig. 1. Since the plow bottoms are counterbalanced, only a small weight is required to be lifted and therefore, only a limited pull is exerted through the link 72. Meanwhile, the other plow bottom will have been allowed to descend through the medium of the counterbalancing cable 41, and its swinging arm 65 and latch 70 will have risen. As previously indicated, the last of the plow change will be rather rapid due to the gravity effects produced by the overbalancing of the descending plow bottom 40. Thus, ordinarily it will be unnecessary to pull the actuated swinging arm 65 all the way down to the illustrated lower position which it assumes. Since the rising swinging arm 65 is not under control of its pull link 72 and positioning arm 74, by reason of the fact that the respective end of the draw bolt 80 does not project into the path of such arm 74, such swinging arm 65 is returned freely to its upright position as its plow bottom 40 descends. To insure engagement of the respective latch 70 over the lock bar 68, each latch 70 or its operating arm 92 is spring loaded as by the spring 98 indicated in Fig. 1. When it is again desired to reverse the position of the plow bottoms 40, the draw bolt 80 is shifted in the opposite direction, and as a consequence, actuation of the power lift L will reverse the above described operation.

However, should it be not desired to change the plows on any given excursion of the box frame B, the draw bolt 80 will be left in its position of the preceding operation and will not be shifted. Thus, the link 72 and arm 74 of the lowered plow bottom will not be energized, and the other link 72 will not be effective because its plow bottom is already in raised position.

When operating the structure of Figs. 7 and 8, the draw bolt 80 is shifted as before, and when the power lift L is energized by the tractor operator, initial pull of the pull link 72 for the lowered plow bottom 40 operates upon the actuating pin 104 to swing forward the upper end of the respective latch operating arm 102 whose top lug 102a engages against the shoulder 105 of the respective latch 70, thereby lifting the latch finger 70a from behind the lock bar 68 and freeing the respective swinging arm 65. Further movement upward of the box frame B causes the same relative motion of the respective swinging arm 65 and its plow bottom 40 as described in connection with the structure of Figs. 1 to 6.

Return of a lowered swinging arm 65 and its latch-operating arm 102 to upright position is accomplished when the respective plow bottom 40 is lowered from elevated position shown in Fig. 7 to the lowered position shown in Fig. 8. Such lowering takes place by gravity under the control of the interconnecting cable 41 as the lowered plow bottom 40 is being raised from the lowered position to the raised position under the pulling action of the pull link 72, latch-operating arm 102 and swinging actuating arm 65 for the plow bottom which is being raised. As the rising swinging arm 65 reaches the lug 102a of the operating arm 102, the latch 70 on the rising arm 65 passes under the lug 102a until the latter is struck by the shoulder 105 of the latch 70. Continued downward movement of the descending plow bottom 40 under influence of gravity causes the respective swinging arm 65, its latch 70 and the respective arm 102 to move up into vertical position until the lock bar 68 is struck and the latch finger 70a drops down into latching position behind the lock bar 68.

In operating the modification shown in Figs. 9 to 13, when the draw bolt 80a is in the operative position illustrated in Fig. 9, or when the fixed pivot 121a of Fig. 13 is used for the link 117, elevation of the box frame B by the power lift L results in the pull link 117 drawing the latch operating arm 110 forward in an arc about the lower supporting shaft 36 by reason of the pull of the respective end of the tripping cross head 115 against the shoulder 105 of the respective latch 70, the initial swinging movement of the cross head 115 serving to release the latch finger 70a, and the following portion of the movement operating to raise the lowered plow bottom 40 through the respective pull bar 60, as in the other forms, and by reason of the connection of the upper end of the pull bar 60 to the respective swinging arm 65. The opposite plow bottom 40 and its swinging arm simultaneously move to their operative positions by reason of the interconnection by the counterbalancing cable 41. When it is necessary for the latch operating arm 110 to be returned to its upright position after the rising swinging arm 65 has risen beyond the position of the latch operating arm 110, the cross head 115 will rise up over the rounded shoulder 105 of the respective latch 70 against the tension of the springs 125. After reaching its normal or upright position, the springs 125 will pull the cross head 115 down into position behind the shoulder 105 of the latch 70 on the upstanding swinging arm 65 and positively latch it in position behind the lock bar 68.

It will be apparent that, when the latch operating arm 110 is in vertical position, the cam 112 on the swinging arm 65 of the elevated plow bottom 40 will have shifted the latch operating arm 110 in the opposite direction so that the opposite end of the cross head 115 lies in the path of the shoulder 105 of the latch 70 on the other swinging arm 65, and that the cam 112 on the descending plow bottom 40 will have cleared the respective boss 113 on the latch operating arm 110 so that the latter can be shifted later by the cam 112 on the other swinging arm 65. Thus, as the swinging arms 65 are raised and lowered they automatically shift the latch operating arm 110 back and forth to shift the cross head 115 to and from the paths of the respective latch shoulders 105.

In all forms of the invention herein disclosed, the two mounting shafts 36 and 37 and the slidable mounting blocks 54 provide for effects not heretofore possible in two-way plow structures, and as a consequence they impart much greater flexibility in such devices than heretofore possible. More specifically, these mounting shafts and blocks make it possible to adjust in the field the relative positions of the plow bottoms for whatever purpose, and they also make it simple to replace the plow bottoms with those of larger or smaller dimensions.

Thus, by loosening the nuts 56 on the eye bolts 53, the bolts may be moved up or down in the arcuate slots 55 for the purpose of levelling the plow bottoms to accord with given plowing conditions. Also, the nuts 56 may be adjusted along the eye bolts 53 to vary the effective lengths of the eye bolts of each pair so as to change the position of the toe or point of the respective plow bottom and thereby change the "lead" to shift the point to the right or left and thereby correct for over or under cutting, and consequently adjust side draft. Again, upon loosening of the set screws 58 of the respective mounting blocks 54, the blocks may be slid along the shafts 36 and 37 either for the purpose of spacing the bottoms already installed, or for replacing them with wider or narrower bottoms. Thus, with the present improvement, various widths of plow bottoms from 10 inches to 18 inches in width, or greater, may be used. In a structure adapted for maximum plow bottom widths of 18 inches, the inner block 54 of each pair will be shifted over approximately to the median line of the box frame B, and the respective plow bottoms 40 installed as previously described. If 16 inch plow bottoms are used, the blocks are shifted so that the inner block of each pair is located about two inches outward along the shafts 36 and 37, and in the case of 10 inch plow bottoms the blocks might be shifted outward as much as eight inches from the middle. All of these adjustments are quickly accomplished with the mountings of the present improvement.

Such easy adjustment with the plow bottom mountings also makes it possible to eliminate the common shifting of tractor wheels to vary the tread when two-way plows are to be used. As is familiar to every tractor and plow operator, the moving or reversing of tires and wheels on tractors to accommodate different plows is a very tedious operation, especially when it is considered that in many tractors the wheels are heavily loaded and may weigh as much as 1000 pounds apiece. It is therefore a great advantage to be able to avoid this heavy work merely by loosening the set screws 58 and sliding the plow beams along the shafts 36 and 37 to required positions.

In connection with the above mentioned adjustment of the lead of the points of the plow bottoms, the adjustments by shifting of the nuts 56 on the eye bolts 53 are quickly accomplished in the field. If the given plow bottom is cutting too narrow a swath, the shifting of the point of the plow bottom is thus quickly attained, thereby presenting a greater width of effective cutting edge to the soil. Again, if the plow bottom is over cutting, and thereby causing excessive side thrust or side draft to be exerted against the plow bottom, its point may be easily shifted. Similarly, the plow bottoms may be quickly levelled by raising or lowering the eye bolts 53 in their slots 55. By reason of the fact that the mounting blocks 54 may themselves be adjusted to shift the plow beams 38 and their plow bottoms, this avoids the necessity for attempting to accomplish similar results by excessive adjustment of the lead of the plow points. Also, the plow beams may be easily brought together when they are both lowered for ditching purposes.

From the foregoing, it will be apparent that the present box frame construction makes it possible to employ a single frame structure for many different plow bottoms, and also eliminates the necessity of reversing the tires and wheels of the tractor when changing from one type or size of plow or other tool to another.

Since other modifications of the generic invention herein disclosed will occur to those skilled in this art, it is intended to protect all variations which fall within the scope of the patent claims.

I claim as my invention:

1. In combination in a plow structure: a frame adapted to be supported in upright position by a tractor power lift mechanism; a transverse supporting shaft carried by said frame; a plow beam having pivotal mounting upon said supporting shaft and adapted to swing in a vertical plane, said plow beam carrying a plow bottom to be raised and lowered therewith; a second transverse supporting shaft carried by said frame; a swinging arm mounted upon said second shaft and having operative connection with said beam and said plow bottom for elevation thereof; lock means carried by said frame; latch means carried by said arm and adapted to cooperate with said lock means for locking said plow beam and bottom in operative position; pull means adapted to be connected to said tractor and having pivotal connection with said swinging arm; latch operating means connecting said pull means with said latch means; and a second plow beam provided with a second oppositely pitched plow bottom, said latch operating means being an arm mounted on one of said shafts, said plow beams and said latch operating arm being provided with co-operating cam means whereby said latch-operating arm is shifted upon its supporting shaft as said beams are raised and lowered, and said beams being interconnected whereby one plow bottom descends as the other plow bottom is raised.

2. In combination in a plow structure: a frame adapted to be supported in upright position by a tractor power lift mechanism; a transverse supporting shaft carried by said frame adjacent its lower end; a plow beam having pivotal mounting upon said supporting shaft and adapted to swing in a vertical plane, said plow beam carrying a plow bottom to be raised and lowered therewith; a second transverse supporting shaft carried by said frame adjacent the other transverse shaft; a swinging arm mounted upon said second shaft and having operative connection with said beam and said plow bottom for elevation thereof; and pull means adapted to be connected to said tractor and having a continuing pivotal connection with said swinging arm to swing said arm and plow beam on said shafts.

3. A combination as in claim 2 including mounting means movably carried upon both of said transverse shafts, one of said shafts being disposed at an elevation above the other, said plow beam being pivotally mounted upon said mounting means.

4. In combination in a two-way plow to be drawn and supported by a tractor: a pair of oppositely pitched plow bottoms; plow beams respectively carrying said plow bottoms; an upstanding frame; means for supporting said frame upon a tractor for automatic raising and lowering of the frame by a power lift on the tractor; a pair of parallel transverse supporting shafts mounted in the lower portion of said frame; plural mounting means mountable on said shafts, each mounting means being movably mounted on both of said shafts; means swingingly attaching said plow beams to said mounting means; and means for swinging said beams and their plow bottoms on said mounting means.

5. In combination an earthworking structure: an upstanding frame; means for supporting said frame upon a tractor for automatic raising and lowering of the frame by a power lift on the tractor; a pair of parallel transverse supporting shafts mounted in the lower portion of said frame; plural mounting means mountable on said shafts, each mounting means being mounted on both of said shafts; and earthworking tools mounted upon said mounting means and including rearwardly extending beam means, said mounting means including adjusting means for varying the angular position laterally of said beam means to adjust side draft of the earthworking tools.

6. In combination in a plow: an upstanding frame having means adapted for supporting said frame upon a tractor for automatically raising and lowering the frame by a power lift mechanism on the tractor; a plow unit; a pair of parallel, transverse supporting shafts mounted in the lower portion of said frame; a plurality of mounting blocks each of which is movably mounted upon each of said shafts for lateral movement therealong; and means carried by said blocks and mounting said plow unit thereupon for swinging movement in vertical directions between elevated and lowered positions.

7. An earthworking structure comprising in combination: a support adapted to be mounted upon an elevationally controlled draft connection of a vehicle having a power lift to impart vertical movements to said support, said support including a vertical frame, two horizontal bars mounted in said frame, and a mounting block adjustably carried upon both bars to slide therealong and be positioned thereby; a beam having a horizontal working position and carrying earthworking means; and mounting means retaining said beam and earthworking means on said block for movement thereon between operative and inoperative positions and for raising and lowering with said block and said frame by said power lift.

8. A combination as in claim 7 wherein said mounting means for said beam and earthworking means includes adjusting means providing for lateral movement of rearward portions of said beam to adjust for side draft of said earthworking means.

9. In combination in a two-way plow: a pair of oppositely pitched plow bottoms, plow beams respectively carrying said plow bottoms; means interconnecting said plow bottoms and plow beams in counterbalanced relationship and providing for lowering one plow bottom as the other is raised; an upstanding frame; means for supporting said frame upon a tractor for automatic raising and lowering of the frame by a power lift on the tractor; a pair of parallel transverse supporting shafts mounted in the lower portion of said frame; plural mounting means mountable on said shafts, each mounting means being mounted on both of said shafts; and means swingingly attaching said plow beams to said mounting means.

10. In combination in a two-way plow: an upstanding frame having means adapted for supporting said frame upon a tractor for automatically raising and lowering the frame by a power lift mechanism on the tractor; a plurality of plow units; a pair of parallel, transverse supporting shafts mounted in the lower portion of said frame; a plurality of mounting blocks each of which is movably mounted upon each of said shafts for lateral movement therealong; and means carried by said blocks and mounting said plow units thereupon for swinging movement in vertical directions between elevated and lowered positions.

11. In combination in a plow structure; an upstanding frame having means adapted for supporting said frame upon a tractor for automatically raising and lowering of the frame by a power lift mechanism on the tractor; transverse supporting shaft means mounted in the lower portion of said upstanding frame to carry a plurality of plow units; a plurality of mounting block means adjustable transversely of said shaft means; and plural movable means movably carried by said block means and carrying said plow units for movement of the latter vertically between elevated and lowered positions, whereby said plow units may be spaced variably from one another along said transverse supporting shaft means.

12. A combination as in claim 11 wherein said plurality of adjustable mounting block means is arranged in pairs, and each pair thereof carries one of said plural movable means, and beam means fixed on each of said plural movable means and carrying respective plow units.

13. A combination as in claim 12 wherein one of said plural movable means carries spaced plow units swinging together with such movable means in vertical planes.

14. A combination as in claim 12 wherein one of said plural movable means carries a single beam and plow unit to swing in a vertical plane.

15. In combination in a two-way plow: an upstanding frame; means for supporting said frame upon a tractor for automatically raising and lowering said frame by a power lift on the tractor; a pair of transverse parallel supporting shafts mounted on a lower portion of said frame; a plurality of mounting devices, each of which is mounted on both of said supporting shafts; plow beams mounted upon said mounting devices to swing vertically; oppositely pitched plow bottoms carried by said beams; means interconnecting said beams and plow bottoms in counterbalanced relation; swinging arm means mounted upon one of said shafts adjacent the respective plow beams to swing vertically; means connecting each swinging arm means with the respective plow beam to swing in unison therewith, each swinging arm means upstanding adjacent said frame when its plow bottom is in lowered, operative position; and pull link means operatively connected with each swinging arm means and adapted for connection with a lower portion of the tractor to pull on its swinging arm means as said frame is raised by said power lift, whereby to elevate the respective plow bottom.

16. In combination in an earthworking structure: an upstanding frame; means for supporting said frame upon a tractor for raising and lowering of the frame by a lift on the tractor; a plurality of transverse supporting bar means carried by said frame; plural mounting means carried by said bar means, at least one mounting means being movable with respect to said bar means; beam means movably carried in horizontal position by said mounting means; earthworking means mounted upon said beam means and movable with said beam means between operative and inoperative positions with respect to earth being worked; and means for moving said beam means and earthworking means between said positions.

17. In combination as in claim 16 wherein the means for moving said beam means is swinging arm means operatively connected with said beam means to effect movement of said earthworking means between said operative and inoperative positions.

18. In combination in a two-way plow: oppositely pitched plow bottoms; beam means carrying said plow bottoms and having a substantially horizontal working position; upstanding frame means; means for supporting said frame means upon a tractor for raising and lowering of the frame means by a lift on the tractor; spaced, transverse supporting bars carried by said frame means; mounting means mounted on said spaced bars, said beam means being movably mounted on said mounting means to move said plow bottoms between earth-engaging position and earth-disengaging position; and means to move said beam means on said mounting means.

19. A combination as in claim 18 wherein said beam-moving means is swinging arm means operatively connected therewith.

20. In combination in an earthworking apparatus: an upstanding frame; means for supporting said frame upon a tractor for raising and lowering thereof by a lift on the tractor; a plurality of spaced transverse supporting bar means carried by said frame; a pair of mounting means carried by said bar means, at least one of said mounting means being adjustable with respect to said bar means; single beam means movably carried by said pair of mounting means to move with respect thereto; earthworking means mounted upon said beam means and movable with said beam means between operative and inoperative positions with respect to earth being worked; and means for moving said beam means and earthworking means between said positions.

21. A combination as in claim 20 wherein said beam means has a horizontal working position and wherein said mounting means includes means to change the angularity of said beam means horizontally for varying side draft of said earthworking means.

22. A combination as in claim 20 wherein said mounting means are movable transversely on said supporting bar means.

WILLIAM FISK MELLEN.

References Cited in the file of this patent

UNITED STATES PATENTS

| Number | Name | Date |
|---|---|---|
| 261,176 | Sanborn | July 18, 1882 |
| 341,250 | Kimmell | May 4, 1886 |
| 631,152 | Carroll | Aug. 15, 1899 |
| 633,333 | Beall | Sept. 19, 1899 |
| 1,375,457 | Heider | Apr. 19, 1921 |
| 1,420,108 | Kinney | June 20, 1922 |
| 1,431,815 | Kanke | Oct. 10, 1922 |
| 1,437,032 | White | Nov. 28, 1922 |
| 1,901,539 | Tapp | Mar. 14, 1933 |
| 2,352,466 | Arps | June 27, 1944 |
| 2,358,964 | Noffsinger | Sept. 26, 1944 |
| 2,401,837 | Mellen et al. | June 11, 1946 |
| 2,424,192 | Rogers et al. | July 15, 1947 |
| 2,437,879 | Ferguson | Mar. 16, 1948 |
| 2,457,163 | Lansing | Dec. 28, 1948 |
| 2,474,731 | Evans | June 28, 1949 |
| 2,529,809 | Mellen | Nov. 14, 1950 |
| 2,561,650 | Carlson | July 24, 1951 |
| 2,575,428 | Rogers | Nov. 20, 1951 |

FOREIGN PATENTS

| Number | Country | Date |
|---|---|---|
| 887,714 | France | Aug. 23, 1943 |